US009103091B2

(12) United States Patent
Buckner

(10) Patent No.: US 9,103,091 B2
(45) Date of Patent: Aug. 11, 2015

(54) SYSTEM AND METHOD TO EXCAVATE AND FILL

(75) Inventor: Don M. Buckner, Okahumpka, FL (US)

(73) Assignee: VAC-TRON EQUIPMENT, LLC, Aurora, CO (US)

(*) Notice: Subject to any disclaimer, the term of this patent is extended or adjusted under 35 U.S.C. 154(b) by 59 days.

(21) Appl. No.: 13/459,308

(22) Filed: Apr. 30, 2012

(65) Prior Publication Data
US 2013/0287530 A1   Oct. 31, 2013

(51) Int. Cl.
B65G 53/46 (2006.01)
E02F 7/02 (2006.01)
E02F 3/88 (2006.01)
E02F 7/06 (2006.01)

(52) U.S. Cl.
CPC ............. E02F 7/02 (2013.01); B65G 53/4625 (2013.01); E02F 3/8816 (2013.01); E02F 7/06 (2013.01)

(58) Field of Classification Search
USPC .......................... 406/62–68, 109, 38, 39, 128
See application file for complete search history.

(56) References Cited

U.S. PATENT DOCUMENTS

| 585,804 | A | * | 7/1897 | Weber | 406/64 |
|---|---|---|---|---|---|
| 1,471,927 | A | * | 10/1923 | Schutt et al. | 406/65 |
| 2,026,732 | A | * | 1/1936 | Farley | 406/65 |
| 2,152,632 | A | * | 4/1939 | Cassiere | 406/67 |
| 2,230,425 | A | * | 2/1941 | Finnegan | 406/65 |
| 2,639,601 | A | | 5/1953 | Miller | |
| 2,798,628 | A | * | 7/1957 | Fisher | 406/67 |
| 2,946,626 | A | * | 7/1960 | Atkinson et al. | 406/67 |
| 3,077,365 | A | * | 2/1963 | Fisher | 406/23 |
| 3,129,980 | A | * | 4/1964 | Kiesbar et al. | 406/65 |
| 3,224,813 | A | * | 12/1965 | Jezo | 406/64 |
| 3,399,931 | A | * | 9/1968 | Vogt | 406/64 |
| 3,899,214 | A | * | 8/1975 | Stupfel | 406/65 |
| 4,119,238 | A | | 10/1978 | Ja'afar | |
| 4,334,633 | A | | 6/1982 | Piegza | |
| 4,599,016 | A | * | 7/1986 | Medemblik | 406/67 |
| 4,744,698 | A | | 5/1988 | Dallimer | |
| 4,760,656 | A | | 8/1988 | East | |
| 5,092,963 | A | | 3/1992 | Barker | |
| 5,181,804 | A | * | 1/1993 | Wysong et al. | 406/67 |
| 5,191,993 | A | | 3/1993 | Wanger | |
| 5,324,143 | A | * | 6/1994 | Sanders | 406/67 |
| 5,500,976 | A | | 3/1996 | Rohrbacher | |
| 5,515,625 | A | | 5/1996 | Keigley | |
| 5,725,332 | A | * | 3/1998 | Harper et al. | 406/67 |
| 5,887,667 | A | | 3/1999 | Van Zante | |
| D423,521 | S | | 4/2000 | Walter | |
| 6,360,458 | B2 | | 3/2002 | Dolister | |
| 6,397,967 | B1 | | 6/2002 | McIlwraith | |

(Continued)

Primary Examiner — William R Harp
(74) Attorney, Agent, or Firm — Matthew G. McKinney, Esq.; Allen, Dyer, Doppelt, Milbrath & Gilchrist, P.A.

(57) ABSTRACT

A system and method to excavate and fill is disclosed. The system includes a canister adapted to receive and store excavated material. In addition, a plurality of blades are mounted inside of the canister about a horizontal shaft proximate a bottom end of the canister. A motor is adapted to rotate the plurality of blades to move the excavated material stored in the canister to the bottom end of the canister and a blower is adapted to blow the excavated material at the bottom end of the canister out of an opposing side of the canister through a discharge port. The canister includes a downward sloping lip disposed above the plurality of blades, where the downward sloping lip funnels the excavated material on to a downwardly rotating blade of the plurality of blades.

18 Claims, 3 Drawing Sheets

(56) References Cited

U.S. PATENT DOCUMENTS

| | | |
|---|---|---|
| 6,499,934 B1 | 12/2002 | Kaczmarski |
| 6,550,406 B2 | 4/2003 | Bass |
| 6,604,304 B1 | 8/2003 | Slabach |
| 6,988,568 B2 | 1/2006 | Buckner |
| 7,484,322 B2 | 2/2009 | Maybury, Jr. |
| 7,837,050 B2 | 11/2010 | Maybury, Jr. |
| 8,066,140 B1 | 11/2011 | Young |
| 8,336,231 B2 | 12/2012 | Maybury, Jr. et al. |

\* cited by examiner

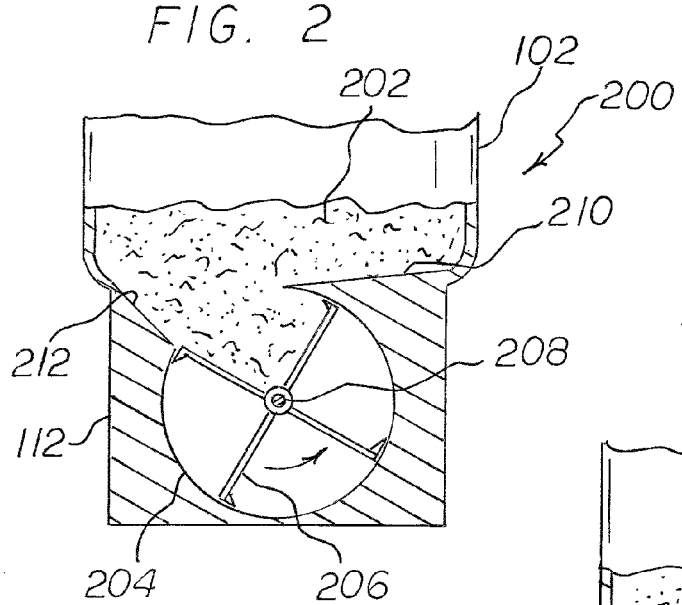
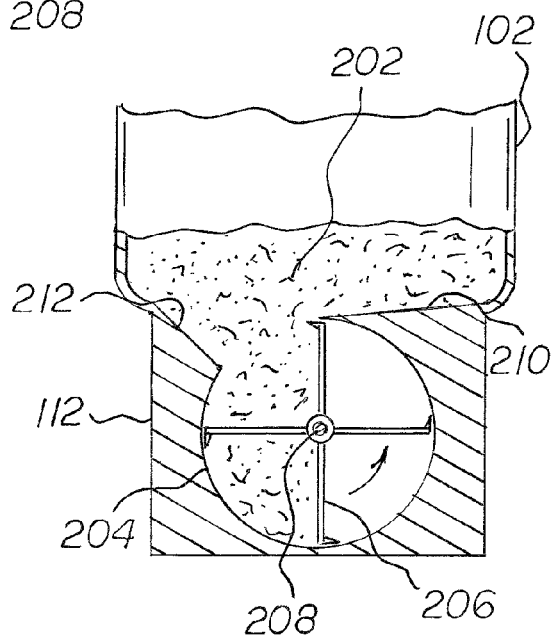
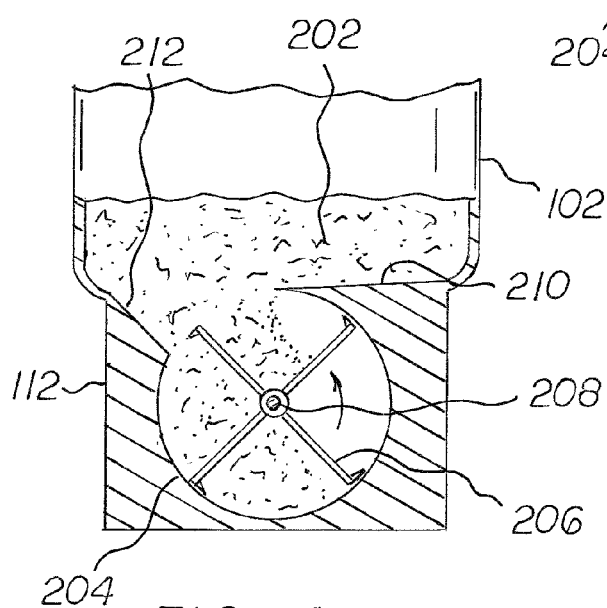

SYSTEM AND METHOD TO EXCAVATE AND FILL

I. FIELD OF THE INVENTION

The present invention relates generally to a system and method to excavate and fill.

II. BACKGROUND

Industrial vacuum equipment has dozens of wet and dry uses such as locating underground utilities (potholing), hydro excavation, air excavation and vacuum excavation. In addition, the equipment can be used for directional drilling slurry removal, industrial clean-up, waste clean-up, lateral and storm drain clean-out, oil spill clean-up and other natural disaster clean-up applications, signs and headstone setting, for example. The vacuum systems may be mounted to a truck or trailer and are typically powered by gas or diesel engines. The material is vacuumed up and stored in a storage tank. From there, the material may be hauled away and disposed or the tank is emptied by opening a rear hatch and dumped in a pile at the site. In addition, outside material may be imported to the location of the hole for backfill. Workers move the material by hand from the pile and fill in the excavation and holes as needed. A shortcoming of the prior art is the inefficiency and difficulty to fill the excavation (or holes) easily, quickly and with precision. Accordingly, what is needed is a method and system to excavate and fill that can both excavate material and selectively return the fill material to a site in a controlled manner.

III. SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In a particular embodiment, a system to excavate and fill is disclosed. The system includes a canister adapted to receive and store excavated material. In addition, a plurality of blades are mounted inside of the canister about a horizontal shaft proximate a bottom end of the canister. A motor is adapted to rotate the plurality of blades to move the excavated material stored in the canister to the bottom end of the canister and a blower is adapted to blow the excavated material at the bottom end of the canister out of an opposing side of the canister through a discharge port. A grate may be installed within the canister to catch large rocks and debris to prevent clogging of the system and to return only clean fill. The canister includes a downward sloping lip disposed above the plurality of blades, where the downward sloping lip funnels the excavated material on to a downwardly rotating blade of the plurality of blades.

In another particular embodiment, a method to excavate and fill is disclosed. The method includes vacuuming excavated material into a canister and rotating a plurality of blades mounted inside of the canister about a horizontal shaft proximate a bottom end of the canister. The method further includes blowing the excavated material at the bottom end of the canister out of an opposing side of the canister through a discharge port. The excavated material may also be sorted before discharging in order to return clean fill.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

IV. BRIEF DESCRIPTION OF THE DRAWINGS

FIG. 2 is a cross sectional view of the bottom end of the canister of the system shown in FIG. 1, wherein a downward rotating blade is being loaded with material;

FIG. 3 is a cross sectional view of the bottom end of the canister shown in FIG. 1, wherein the downward rotating blade has sequentially rotated to the bottom of the canister with material;

FIG. 4 is a cross sectional view of the bottom end of the canister shown in FIG. 1, wherein the material is at the bottom of the canister to be blown out the canister as fill material;

V. DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
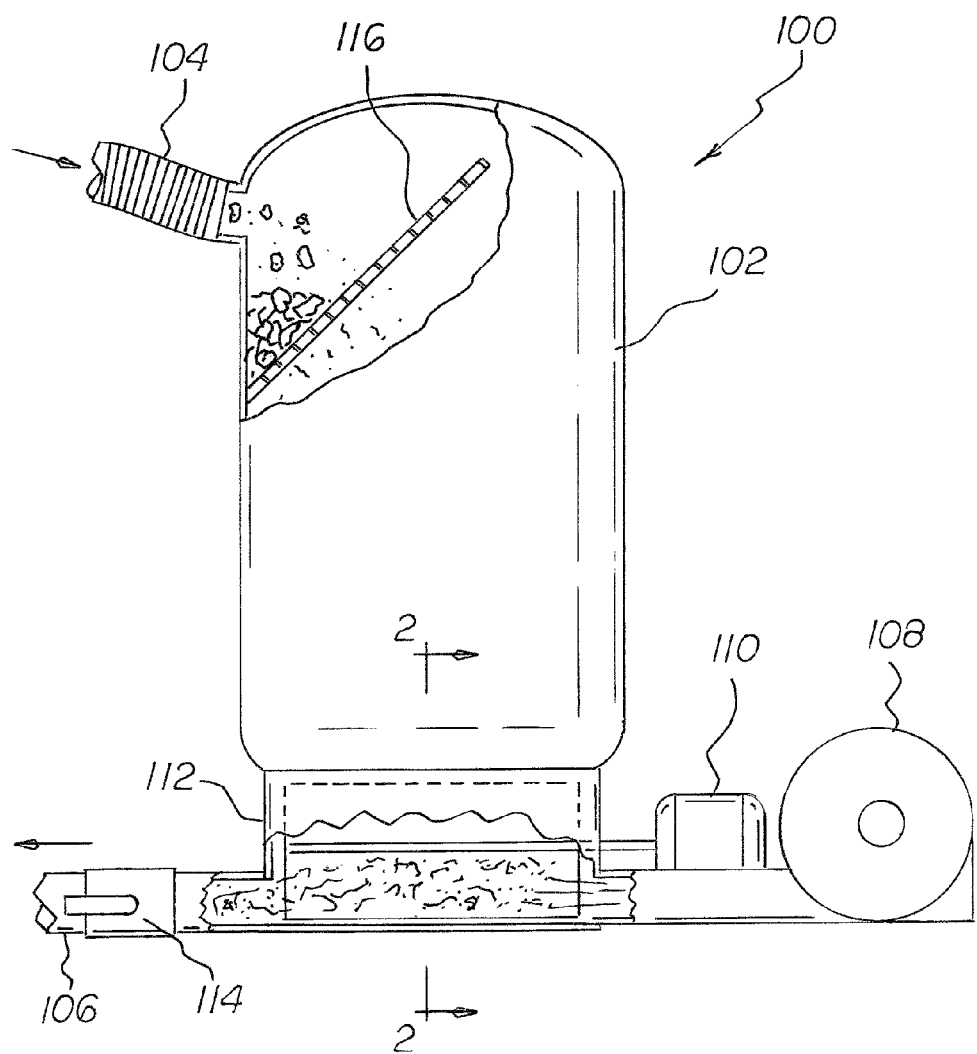
FIG. 1 is an elevation view of a particular embodiment of a system to excavate and fill, wherein the bottom end of the canister is partially cut away.

Referring to FIG. 1, a particular illustrative embodiment of a system to excavate and fill is disclosed. The system 100 includes a canister 102 that is used to store excavated material that has been vacuumed into the canister 102. A vacuum hose 104 may be used to excavate the material and is secured proximate to a top portion of the canister 102. A discharge hose 106 may be secured proximate to the bottom end of the canister 102. The vacuum hose 104 may also be used as the discharge hose 106 rather than having two separate hoses in which case the vacuum hose 104 is removed and secured to the discharge port. A blower 108 is positioned such that when the blower 108 is operational that it blows air at sufficient velocity and volume to push the material at the bottom of the canister 102 out through the discharge port located on an opposing side of the canister 102. A motor 110 is used to rotate a plurality of blades inside the canister 102, where the blades are used to move material to the bottom of the canister 102 to be blown out as fill material. A partial cut away of the canister 102 shows the path of the high pressure air blown through the bottom of the canister 102 to move the material out into the discharge hose 106 under pressure. As illustrated in FIG. 1, the blades are housed at a bottom portion 112 of the canister and gravity helps to rotate the blades downward when loaded with material. A valve 114 at the bottom of the canister 102 may be used to control the volume of fill material being blown out through the discharge hose 106. In addition, selecting a speed of the rotating blades and the velocity of the air may also be used to control the volume of fill material being blown out of the canister 102. A grate 116 or other similar type of sorting device may be installed proximate to the top end of the canister. The grate 116 catches large debris and allows the smaller material to drop through so that clean fill material passes through the bottom portion 112 of the canister.

FIGS. 2-4 show the material being moved in sequence from the canister 102 to the bottom portion 112 of the canister 102 using a blade assembly 200. In FIG. 2, the blades 206 are in a first position and material 202 is falling into a space between two adjacent blades. The blades 206 are mounted about a horizontal shaft 208 where the shaft 208 is connected to the motor 110 that rotates the shaft 208 and blades 206. A downward sloping lip 210 projects from the canister sidewall and is disposed above the plurality of blades 206. the downward sloping lip 210 helps to funnel the excavated material 202 on to the downwardly rotating blade 206. In addition, the lip 210 prevents any significant amount of material 202 from falling on the blades 206 rotating upward so that the weight of the material 202 on the blades rotating downward assists in the rotation by the weight of the material 202 itself. The lip 210 projects outward from the sidewall of the canister 102 to above the shaft 208. A circular housing 204 circumscribes the rotating path of the blades 206 and keeps the material moving to the bottom of the canister 102. Each blade 206 may also include a scoop or wedge at a distal tip to help scrape the material 202 along the housing 204 walls as the blades 206 rotate.

Referring now to FIG. 3, the blades 206 have rotated downward moving the material 202 to the bottom end of the canister 102, where the tip of the blade 206 is at the lowest point of the canister 102. The material 202 is in position to be blown out of the canister 102 by the blower 108. In FIG. 4, the blades 206 continue to rotate as the material 202 is blown out of the canister 102 and the area between the blades 206 is cleared of the material 202. The blades 206 rotate upward within the housing 204 as blades 206 loaded with material 202 rotate downward. The clearance between the tip of the blades 206 and the housing 204 is such that the blown air is mostly compartmentalized at the bottom end of the canister 102.

Figure 5:
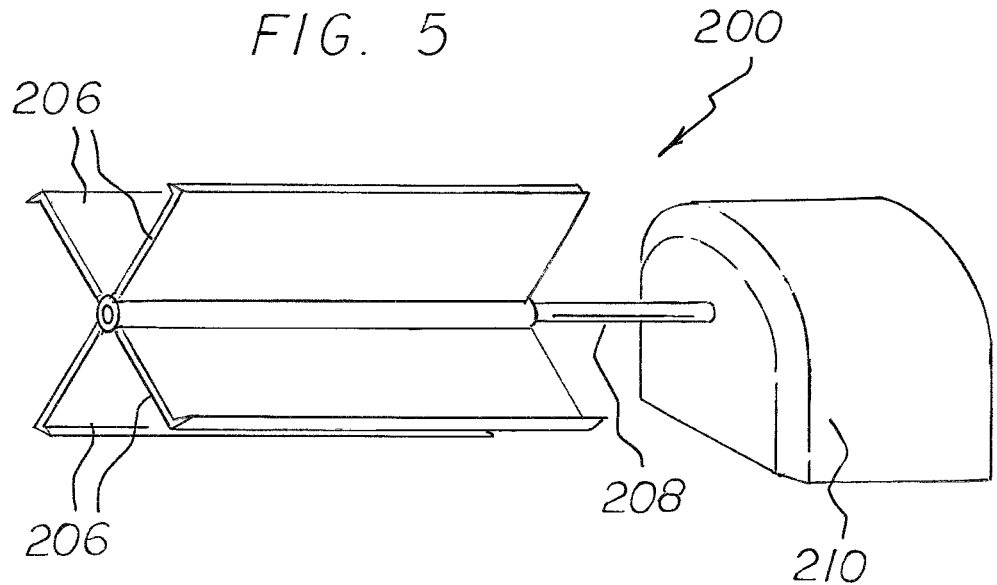
FIG. 5 is a perspective view of the blade assembly and motor used to move material to the bottom of the canister shown in FIGS. 1-4.

In a particular embodiment, the blade assembly 200 shown in FIG. 5 includes four blades 206. The blades 206 are mounted about the shaft 208 in opposing fashion. This assists in the rotation of the blades 206 as one blade is loaded with material 202 rotating downward, an opposing blade is moving upward. However, any number of blades 206 can be used with the system and method. The motor 210 is mounted such that the shaft 208 is adapted to be horizontal and the blades projecting outward. The blades 206 may be generally planar and may also include a pitch. The pitch of the blades 206 may assist in moving the material 202 to the bottom of the canister 202 in a corkscrew manner.

Figure 6:
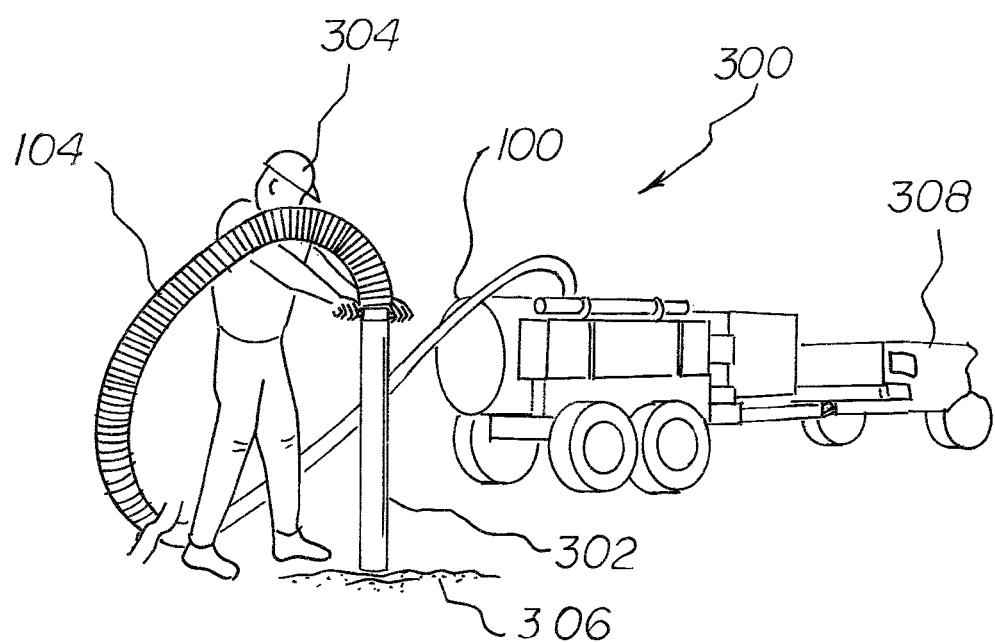
FIG. 6 is a perspective view of the particular embodiment of the system to excavate and fill shown in FIGS. 1-5.

A trailer 300 similar to that shown in FIG. 6 may be used to mount the various vacuum, excavation, and fill equipment of the system or the system may be a mobile system that can be easily transported by any vehicle. The trailer 300 may have a hitch that may be connected to a vehicle 308 for towing to a site. An adjustable jack is used to stabilize the trailer 300 when disconnected from the vehicle 308. A gasoline or diesel engine may be mounted to the trailer 300 and used to power the vacuum equipment 100, hydraulic pumps, pneumatic pumps, blower, motor, or any combination thereof. An air compressor may also be used as part of the system to loosen soil. The motor 210 may also be electric. The suction hose 104 (or discharge hose 106) is connected to the canister 102, which is connected to a filter. A water tank may be used to transport water to the site to supply the pressurized water as part of the excavation process. In the excavation operation, the operator 304 grasps the wand 302 and applies downward pressure to the ground 306. The suction hose 104 vacuums the debris for the excavation to the canister 102. In the fill operation, the blower 108 is activated and the blade assembly 200 begins to move material 202 to the bottom end of the canister 102 as explained above. The material 202 is blown out the discharge hose 106 to fill the excavation or hole. The wand 302 may also be attached to the discharge hose 106 to assist in the fill process. The operator 304 can control the volume of fill material using the valve 114 connected to the discharge hose 106, and also by controlling the speed of the blower 108 and/or motor 110 rotating the blade assembly 200.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.52(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system to excavate and fill, the system comprising:
a canister adapted to receive and store excavated material;
a plurality of blades mounted inside of the canister about a horizontal shaft proximate a bottom end of the canister;
a motor, wherein the motor is adapted to rotate the plurality of blades to move the excavated material stored in the canister to the bottom end of the canister;
a downward sloping lip projecting from a sidewall of the canister to approximately a center line of the canister above the shaft and over upwardly rotating blades of the plurality of blades, and configured to funnel the excavated material on to downwardly rotating blades of the plurality of blades; and
a blower configured to blow air through an area between two adjacent blades to clear the excavated material at the bottom end of the canister out of an opposing side of the canister through a discharge port.

2. The system of claim 1, the canister further comprising a grate proximate to a top end of the canister, wherein the grate adapted to separate a predefined size of debris from the excavated material.

3. The system of claim 2, further comprising a vacuum hose adapted to be secured proximate a top end of the canister.

4. The system of claim 3, further comprising a discharge hose adapted to be secured to the discharge port.

5. The system of claim 4, wherein the plurality of blades are planar.

6. The system of claim 5, further comprising a discharge valve.

7. The system of claim 6, wherein the plurality of blades each further comprising a scoop at a respective distal end.

8. The system of claim 7, wherein each blade of the plurality of blades is mounted to the horizontal shaft opposite another blade.

9. The system of claim 8, wherein the canister is mounted to a trailer.

10. A method to excavate and fill, the method comprising:
vacuuming excavated material into a canister;
rotating a plurality of blades mounted inside of the canister about a horizontal shaft proximate a bottom end of the canister;
using a downwardly sloping lip of the canister to funnel the excavated material on to downwardly rotating blades and to prevent the excavated material from falling on an upwardly rotating blade of the plurality of blades, wherein the downwardly sloping lip extends over upwardly rotating blades of the plurality of blades to approximately a center line of the canister; and
blowing air through an area between two adjacent blades to clear the excavated material at the bottom end of the canister out of an opposing side of the canister through a discharge port.

11. The method of claim 10, the method further comprising separating a predefined size of debris from the excavated material using a grate within the canister.

12. The method of claim 11, further comprising securing a vacuum hose proximate a top end of the canister.

13. The method of claim 12, further comprising securing a discharge hose to the discharge port.

14. The method of claim 13, wherein the plurality of blades are planar.

15. The method of claim 14, further comprising providing a discharge valve to the discharge port to control an amount of excavated material being blown out.

16. The method of claim 15, wherein the plurality of blades each further comprising a scoop at a respective distal end.

17. The method of claim 16, wherein each blade of the plurality of blades is mounted to the horizontal shaft opposite another blade.

18. The method of claim 17, wherein the canister is mounted to a trailer.

* * * * *